US012748278B2

(12) United States Patent
Daoust

(10) Patent No.: US 12,748,278 B2
(45) Date of Patent: Sep. 29, 2026

(54) DEVICE FOR PROVIDING ENHANCED FEEDING OF A FIBER OPTIC CABLE THROUGH A CONNECTOR

(71) Applicant: PPC BROADBAND, INC., East Syracuse, NY (US)

(72) Inventor: Daniel Daoust, Syracuse, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 217 days.

(21) Appl. No.: 18/375,358

(22) Filed: Sep. 29, 2023

(65) Prior Publication Data

US 2024/0111113 A1 Apr. 4, 2024

Related U.S. Application Data

(60) Provisional application No. 63/411,722, filed on Sep. 30, 2022.

(51) Int. Cl.
*G02B 6/44* (2006.01)

(52) U.S. Cl.
CPC .................................... *G02B 6/446* (2013.01)

(58) Field of Classification Search
CPC .................................................... G02B 6/4461
See application file for complete search history.

(56) References Cited

U.S. PATENT DOCUMENTS

| | | | | |
|---|---|---|---|---|
| 6,419,519 | B1 * | 7/2002 | Young | H01R 13/5812 439/446 |
| 6,695,486 | B1 | 2/2004 | Falkenberg | |
| 2014/0041212 | A1 * | 2/2014 | Penumatcha | H01R 43/26 29/748 |
| 2014/0099061 | A1 | 4/2014 | Isenhour et al. | |

OTHER PUBLICATIONS

International Search Report and Written Opinion dated Jan. 19, 2024 in corresponding International Application No. PCT/US2023/034221, 11 pages.

* cited by examiner

*Primary Examiner* — Sung H Pak
(74) *Attorney, Agent, or Firm* — MH2 TECHNOLOGY LAW GROUP LLP; Stuart I. Smith

(57) ABSTRACT

A connector for connecting a cable harness having a fiber optic cable to a node that is configured to enhance feeding of the fiber optic cable through the connector, including: a first portion configured to connect to a node; and a second portion configured to connect to a cable harness having a fiber optic cable. The first and second portions may be configured to allow the fiber optic cable to pass through the first and second portions; the second portion may be configured to rotate relative to the first portion between a first position and a second position; and the second portion and the first portion may be configured to provide access to an interior of the connector from an area outside of the connector when the first and second portions are in the first position so as to enhance feeding of the fiber optic cable through the connector.

23 Claims, 6 Drawing Sheets

DEVICE FOR PROVIDING ENHANCED FEEDING OF A FIBER OPTIC CABLE THROUGH A CONNECTOR

CROSS-REFERENCE TO RELATED APPLICATION

This application claims the benefit of U.S. Provisional Application No. 63/411,722 filed Sep. 30, 2022, the disclosure of which is hereby incorporated by reference herein in its entirety.

BACKGROUND

The present invention relates generally to optical fiber cable management. More particularly, the present invention relates to a connector for connecting a fiber optic cable harness to a cabinet/node and that redirects fiber optic cables in the harness at ninety degrees.

It can be difficult to feed the fiber optic cables of a fiber optic cable harness through a conventional ninety-degree connector due to, for example, difficulty in feeding the fiber optic cables into one opening of the connector, bending the fiber optic cables ninety degrees, and feeding the fiber optic cables out of the other opening of the connector. It can be particularly difficult to feed pre-terminated cables that have a connector attached to the end of the cable.

It may be desirable to provide a node harness feed-through connector that is structurally configured to selectively permit access to an interior of the connector so to enhance feeding of a fiber optic cable through the connector.

SUMMARY

The present disclosure provides a connector that simplifies connection of a fiber optic cable harness to a cabinet/node. In particular, embodiments simplify the feeding of fiber optic cables of the harness through the connector that connects the cables/harness to the cabinet by providing an access window in the connector that allows an installer to guide the cables through the connector while the connector is in a straight position.

Embodiments provide a connector configured to connect a fiber optic cable harness having a plurality of fiber optic cables to a cabinet in a manner that facilitates the feeding of the fiber optic cables through the connector.

Particular embodiments include a connector for connecting a cable harness having a fiber optic cable to a node that is structurally configured to enhance feeding of the fiber optic cable through the connector, including: a first portion structurally configured to connect to a node; and a second portion structurally configured to connect to a cable harness having a fiber optic cable. The second portion may be structurally configured to include a passageway that may be structurally configured to allow the fiber optic cable to pass through the second portion; the first portion may be structurally configured to include a passageway that may be structurally configured to allow the fiber optic cable to pass through the first portion and into the node; one of the first portion and the second portion may include a central area therein; the central area may be structurally configured to allow the fiber optic cable to pass from the passageway in the second portion to the passageway in the first portion; the second portion may be structurally configured to rotate relative to the first portion between a first position and a second position; and the second portion and the first portion may be structurally configured to provide an opening that permits access to the central area from an area outside of the connector when the first and second portions are in the first position so as to enhance feeding of the fiber optic cable through the connector.

In particular embodiments, the first portion may be a cabinet-side portion.

In particular embodiments, the second portion may be a harness-side portion.

In particular embodiments, the node may comprise a cabinet.

In particular embodiments, in the first position, a central axis of the passageway in the second portion may be aligned with a central axis of the passageway in the first portion.

In particular embodiments, in the second position, a central axis of the passageway in the second portion and a central axis of the passageway in the first portion may form an angle less than 180 degrees.

In particular embodiments, in the second position, the central axis of the passageway in the second portion and the central axis of the passageway in the first portion may form an angle of 90 degrees.

In particular embodiments, the first portion may comprise an attachment portion that may be structurally configured to connect the first portion to the node.

In particular embodiments, the attachment portion of the first portion may be structurally configured as a first portion threaded portion.

In particular embodiments, the second portion may comprise an attachment portion that may be structurally configured to connect the second portion to the cable harness.

In particular embodiments, the attachment portion of the second portion may be structurally configured as a second portion threaded portion.

Particular embodiments include a connector for connecting a cable harness having a fiber optic cable to a node that is structurally configured to enhance feeding of the fiber optic cable through the connector, including: a first portion structurally configured to connect to a node; and a second portion structurally configured to connect to a cable harness having a fiber optic cable. The second portion may be structurally configured to include a passageway; the first portion may be structurally configured to include a passageway; the passageway in the first portion and the passageway in the second portion may be structurally configured to provide a path for a fiber optic cable to pass through an interior of the connector; the second portion may be structurally configured to rotate relative to the first portion between a first position and a second position; and the second portion and the first portion may be structurally configured to provide an opening that permits access to the interior of the connector from an area outside of the connector when the first and second portions are in the first position so as to enhance feeding of the fiber optic cable through the connector In particular embodiments, the passageway in the second portion may be structurally configured to allow the fiber optic cable to pass through the second portion.

In particular embodiments, the passageway in the first portion may be structurally configured to allow the fiber optic cable to pass through the first portion and into the node.

In particular embodiments, in the first position, a central axis of the passageway in the second portion may be aligned with a central axis of the passageway in the first portion.

In particular embodiments, in the second position, a central axis of the passageway in the second portion and a central axis of the passageway in the first portion may form an angle less than 180 degrees.

In particular embodiments, in the second position, the central axis of the passageway in the second portion and the central axis of the passageway in the first portion may form an angle of 90 degrees.

In particular embodiments, the first portion may comprise an attachment portion that may be structurally configured to connect the first portion to the node, and the attachment portion of the first portion may be structurally configured as a first portion threaded portion.

In particular embodiments, the second portion may comprise an attachment portion that may be structurally configured to connect the second portion to the cable harness, and the attachment portion of the second portion may be structurally configured as a second portion threaded portion.

Particular embodiments include a connector for connecting a cable harness having a fiber optic cable to a node that is structurally configured to enhance feeding of the fiber optic cable through the connector, including: a first portion structurally configured to connect to a node; and a second portion structurally configured to connect to a cable harness having a fiber optic cable. The first portion and the second portion may be structurally configured to allow the fiber optic cable to pass through the second portion and the first portion; the second portion may be structurally configured to rotate relative to the first portion between a first position and a second position; and the second portion and the first portion may be structurally configured to provide access to an interior of the connector from an area outside of the connector when the first and second portions are in the first position so as to enhance feeding of the fiber optic cable through the connector.

In particular embodiments, the second portion may be structurally configured to include a passageway that may be structurally configured to allow the fiber optic cable to pass through the second portion.

In particular embodiments, the first portion may be structurally configured to include a passageway that may be structurally configured to allow the fiber optic cable to pass through the first portion.

In particular embodiments, one of the first portion and the second portion may include a central area, and the central area may be located between the passageway in the first portion and the passageway in the second portion.

In particular embodiments, in the first position, a central axis of a passageway in the second portion may be aligned with a central axis of a passageway in the first portion.

In particular embodiments, in the second position, the central axis of the passageway in the second portion and the central axis of the passageway in the first portion may form an angle less than 180 degrees Various aspects of the system, as well as other embodiments, objects, features and advantages of this disclosure, will be apparent from the following detailed description of illustrative embodiments thereof, which is to be read in conjunction with the accompanying drawings.

DETAILED DESCRIPTION OF EMBODIMENTS

Embodiments of the disclosure provide a connector that simplifies connection of a fiber optic cable harness to a cabinet. In particular, embodiments simplify the feeding of fiber optic cables of the harness through the connector that connects the cables/harness to the cabinet by providing an access window in the connector that allows an installer to guide the fiber optic cables through the connector while the connector is in a straight position. Embodiments provide a second portion and a first portion are structurally configured to provide an opening that permits access to a central area from an area outside of the connector when the first and second portions are in a first position so as to enhance feeding of the fiber optic cable through the connector.

Figure 1:
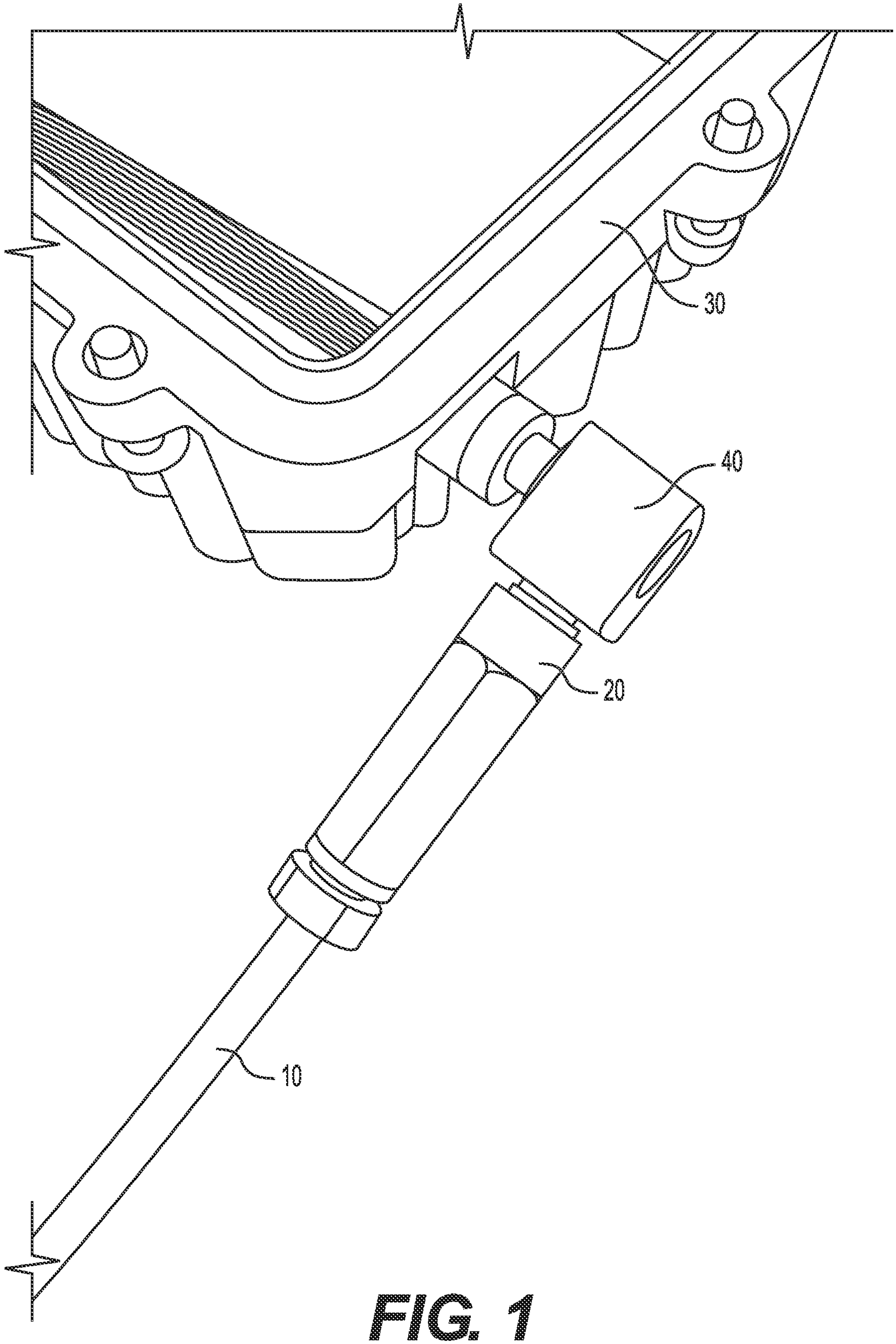
FIG. 1 shows a conventional node harness connector.
Figure 2:
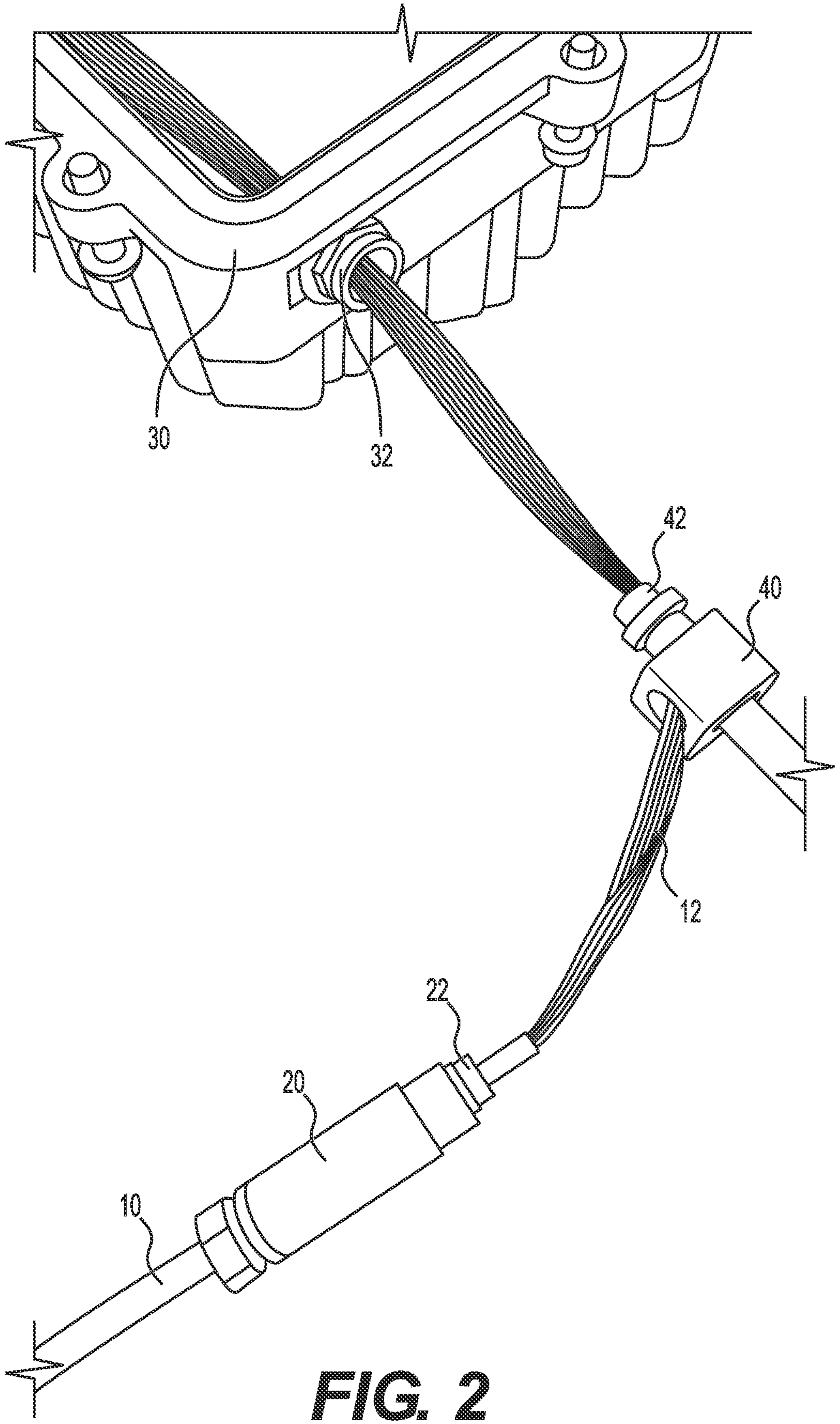
FIG. 2 shows the node harness connector of FIG. 1 in a semi-installed position.

FIGS. 1 and 2 show a conventional ninety-degree connector 40 for connecting a fiber optic cable harness 10 to a cabinet 30. In this example, fiber optic cable harness 10 is connected to ninety-degree connector 40 by a connector 20. As shown in FIG. 2, fiber optic cable harness 10 includes a plurality of fiber optic cables 12 that extend through ninety-degree connector 40 and into cabinet 30. In practice, a threaded connection 22 of connector 20 is threaded into ninety-degree connector 40 and a threaded connection 432 of ninety-degree connector 40 is threaded into a port 32 on cabinet 30. Feeding fiber optic cables 12 through ninety-degree connector 40 can be difficult due to the need for fiber optic cables 12 to bend ninety degrees to pass through ninety-degree connector 40.

Figure 3:
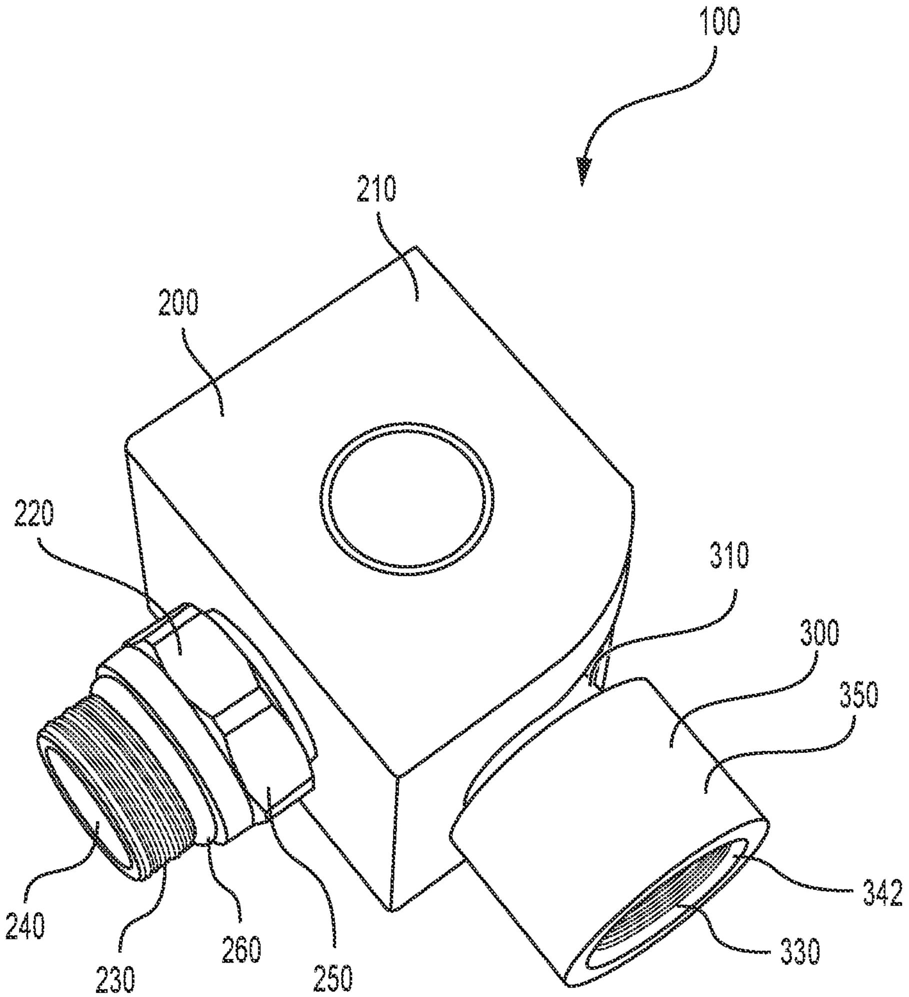
FIG. 3 is a perspective view of an exemplary node harness connector in accordance with various aspects of the disclosure in a ninety-degree position.
Figure 4:
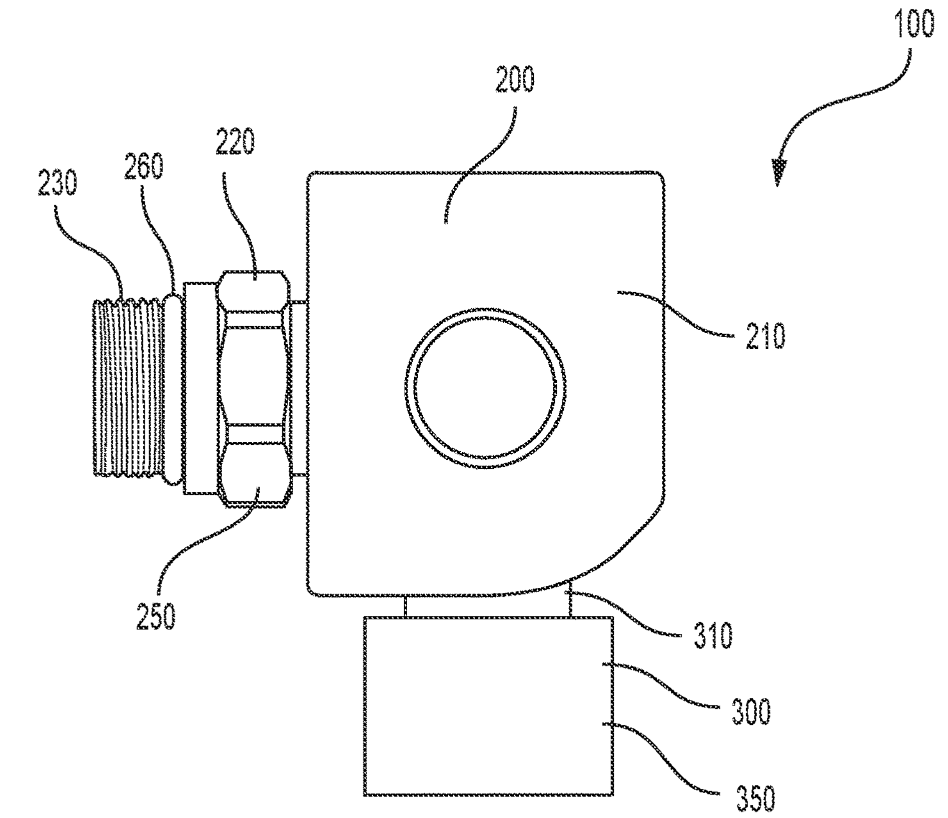
FIG. 4 is a side view of the node harness connector of FIG. 3 in the ninety-degree position.
Figure 5:
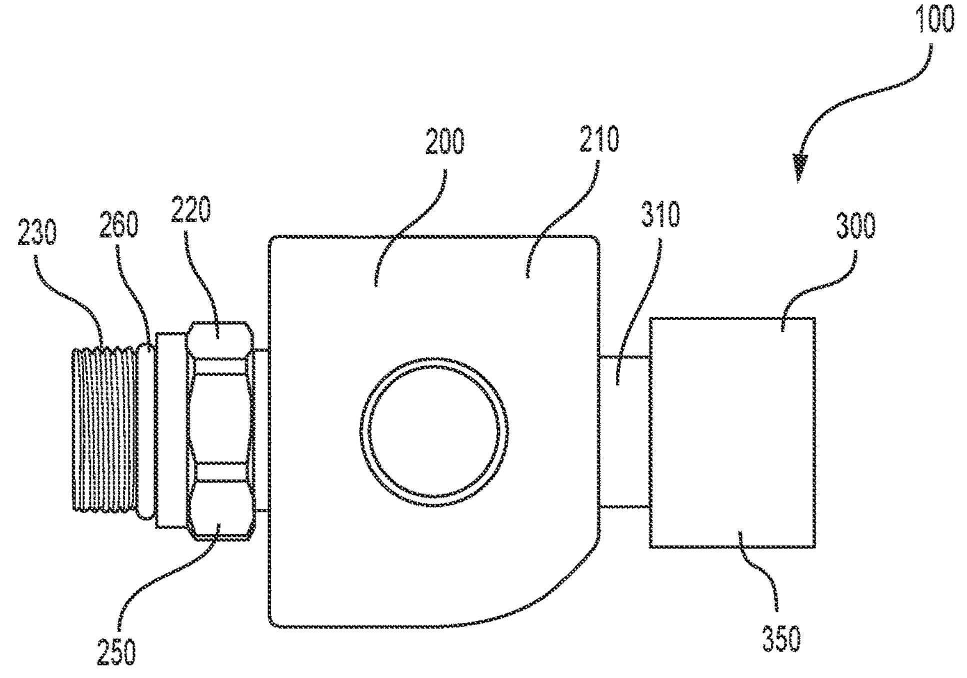
FIG. 5 is a side view of the node harness connector of FIG. 3 in a straight position.
Figure 6:
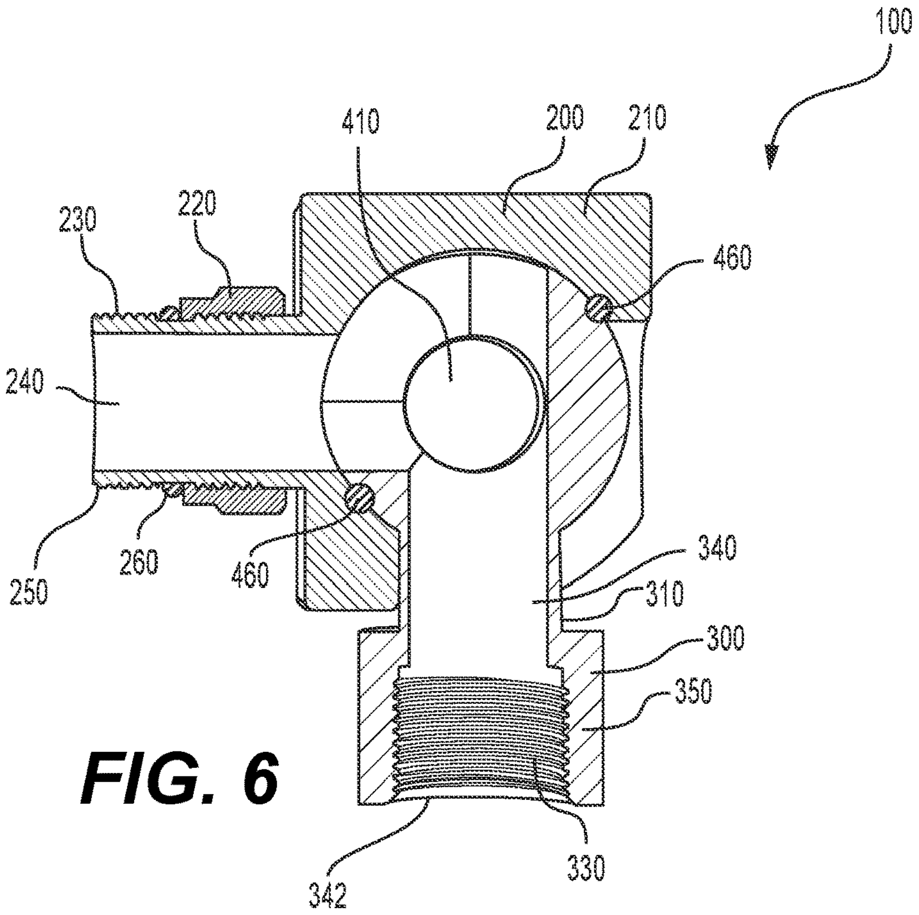
FIG. 6 is a sectional view of the node harness connector of FIG. 3 in the ninety-degree position.
Figure 7:
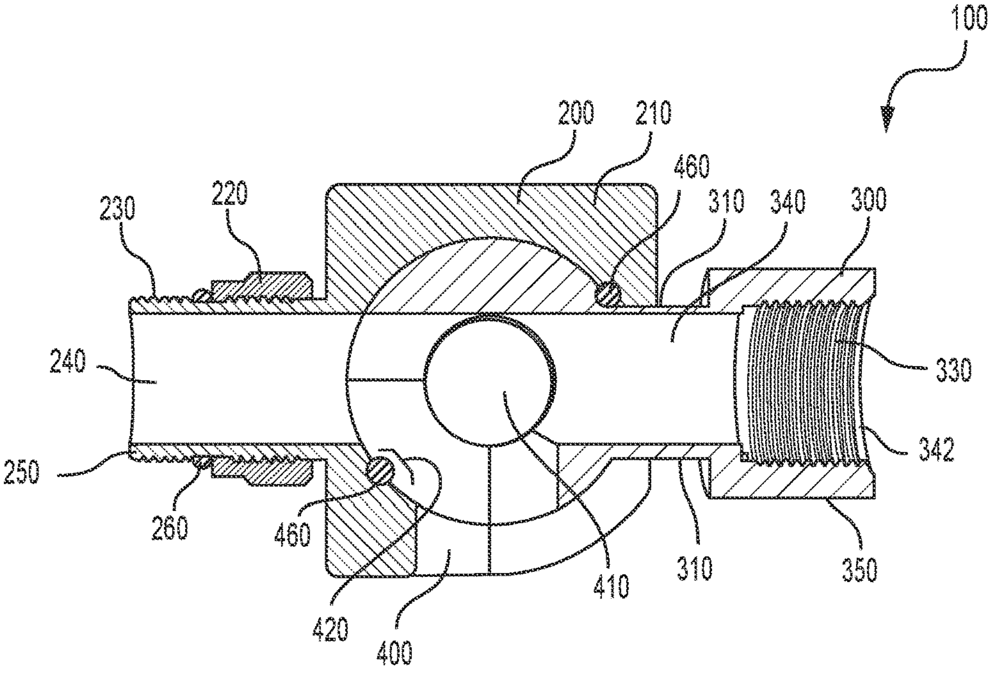
FIG. 7 is a sectional view of the node harness connector of FIG. 3 in the straight position.
Figure 8:
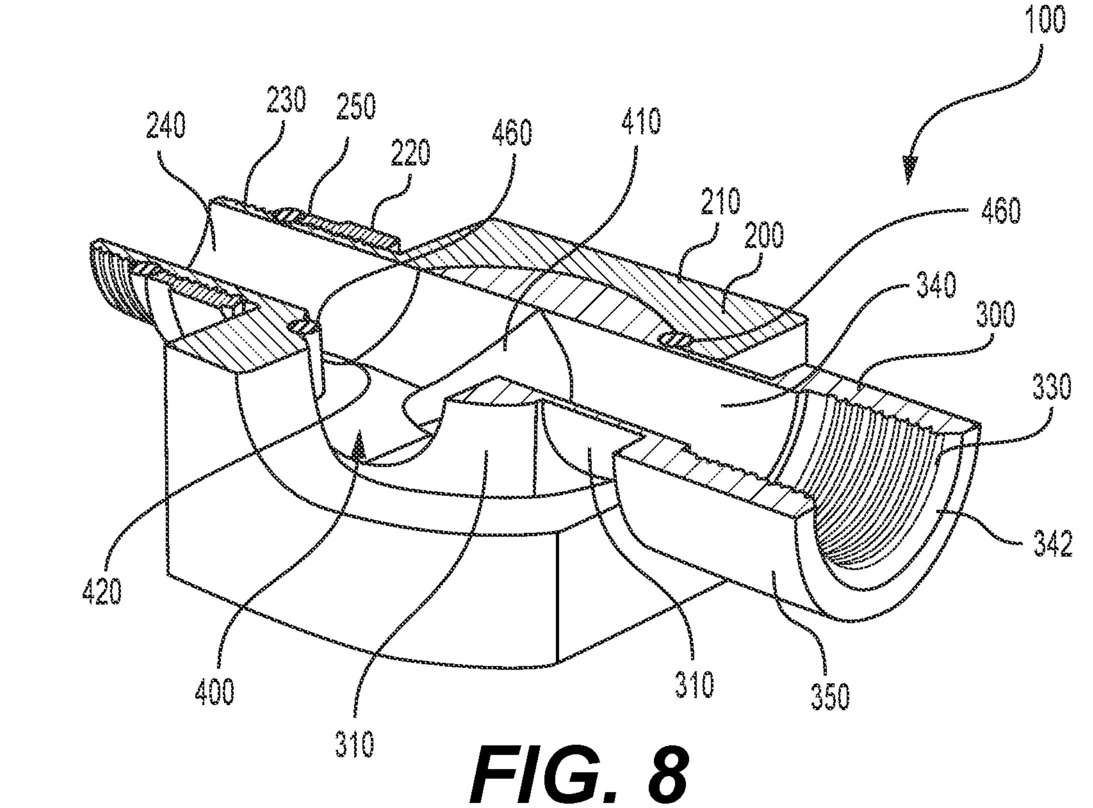
FIG. 8 is a perspective sectional view of the node harness connector of FIG. 3 in the straight position.

Embodiments of the disclosure provide a solution to the difficulties resulting from the structure of a rigid ninety-degree connector such as connector 40 of FIGS. 1 and 2. FIGS. 3-9 show an exemplary connector 100 in accordance with embodiments of the disclosure. In this example, connector 100 is configured to swivel between a straight position (as shown in FIGS. 5, 7 and 8) and an angled position (as shown in FIGS. 3, 4 and 6). Connector 100 has a first portion, for example, a cabinet-side portion 200 that is configured to attach to a cabinet, and a second portion, for example, a harness-side portion 300 that is configured to attach to a fiber optic cable harness.

The cabinet-side portion 200 has a main portion, for example, a main body 210 from which a connection portion 250 extends. The harness-side portion 300 has a main portion, for example, a main body 310 from which a connection portion 350 extends. The main body 210 and the main body 310 are connected to each other such that the main body 310 rotates relative to the main body 210. This relative rotation permits the main body 310 to move between the straight position shown in FIGS. 5, 7 and 8 and the angled position shown in FIGS. 3, 4 and 6. It is significantly easier for a user to feed the fiber optic cables through the connector 100 when the connector 100 is in the straight position shown in FIGS. 5, 7 and 8 because the fiber optic cables do not need to be negotiated around a ninety-degree bend.

The cabinet-side portion 200 has a passageway 240 that extends through the connection portion 250 to an attachment portion, for example, a treaded portion 230. The threaded portion 230 is configured to be threaded into a mating connector on a node or cabinet to which the connector 100 is to be attached. A connecting portion, for example, a nut 220 is threaded onto the threaded connection portion 250 and is configured to compress an O-ring 260 between the nut 220 and the mating connector on the cabinet to create a seal, such as, for example, a waterproof seal, between the connector 100 and the cabinet. The nut 220 also creates a mechanically secure connection between the connector 100 and the cabinet.

The harness-side portion 300 has a passageway 340 that extends through the main body 310 to a connection portion 350. The connection portion 350 is configured to be connected to a mating connector on a harness to which the connector 100 is to be attached. In this example, an attachment portion, for example, a threaded portion 330 inside (in this example) the connection portion 350 is configured to be connected to a threaded connector on the cable/harness. The passageway 340 has an opening 342 through which fiber optic cables are fed into the cable-side portion 300.

FIG. 6 shows the connector 100 in an angled position (ninety-degrees, in this example) which is often the position of the connector 100 when fully installed in the cabinet. In embodiments, the ninety-degree position is a position in which a central axis of the passageway 240 is ninety-degrees to a central axis of the passageway 340. The ninety-degree position is often the most useful position due to clearance issues surrounding the cabinet. As shown in FIG. 6, one or more seals 460 are positioned between the main body 310 and the main body 210 to create a seal between the main body 210 and the main body 310 when the connector 100 is in the angled position shown in FIG. 6. In embodiments, the seal 460 is an O-ring, while in other embodiments, there are multiple seals 460.

As discussed above, negotiating fiber optic cables through the connector 100 in the ninety-degree position can be challenging. As a result, fiber optic cables can be fed through the connector 100 in the straight position shown in FIG. 7. An access portion, for example, an opening or a window 400 is provided between an area outside of the connector 100 and an internal area 410 that is located between the passageway 240 and the passageway 340 when the connector 100 is in the straight position. The window 400 is closed off by the main body 310 when the connector 100 is in the angled position shown in FIG. 6. Although the feeding of fiber optic cables through the connector 100 is made easier by the connector 100 being in the straight position (as compared to the angled position), the fiber optic cables can contact an area 420 that can prevent the fiber optic cables from entering the passageway 240. The window 400 provides an access point where a user of the connector 100 can insert a finger or other tool to guide ends of the fiber optic cables past the area 420 and into the passageway 240.

Figure 9:
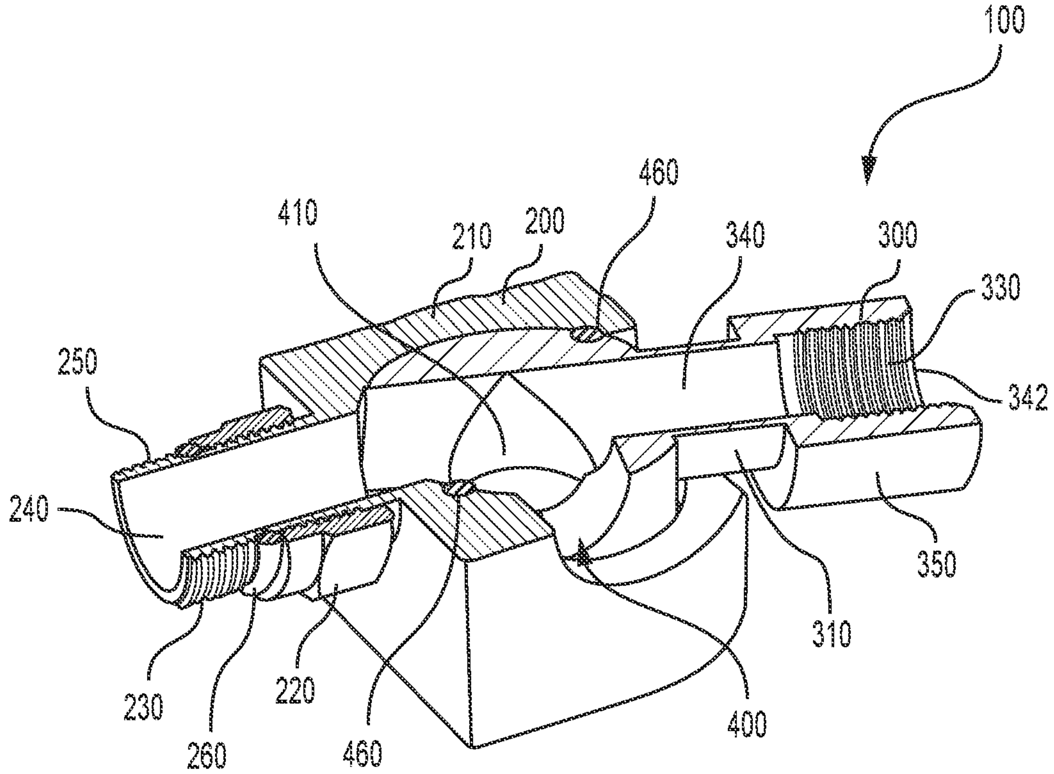
FIG. 9 is a perspective sectional view of the node harness connector of FIG. 3 in a partially rotated position.

FIG. 8 shows the connector 100 in the straight position and illustrates the route through the passageway 340, the area 410, and the passageway 240 taken by one or more fiber optic cable fed through the connector 100. The access to the area 410 provided by the window 400 is shown in FIG. 6. FIG. 9 shows the connector 100 in a partially angled position that is between the straight position and the ninety-degree position. As illustrated by FIG. 9, the window 400 exists in some angled positions of the connector 100 but is smaller than the size of the window 400 when connector 100 is in the straight position. This feature can be useful if the connector 100 cannot be in the straight position due to space confinements around the cabinet.

The fiber optic cables can be fed through the connector 100 before the connector 100 is connected to the cabinet and/or before the connector 100 is connected to the harness. Alternatively, the fiber optic cables can be fed through the connector 100 after the connector 100 is connected to the cabinet and/or after the connector 100 is connected to the harness.

One example of use of the connector 100 is as follows: (1) connect the connector 100 to the cabinet; (2) move the connector 100 to the straight position (if not already in the straight position), or into a position as close to the straight position as allowed by space confinements around the cabinet; (3) feed the fiber optic cables into the passageway 340; (4) continue feeding the fiber optic cables through the area 410; (5) push the fiber optic cables away from the area 420 using a tool inserted through the window 400; (6) continue feeding the fiber optic cables through the passageway 240 and into the cabinet; (7) move the connector 100 to the ninety-degree angled position, or to whatever position is desired; and (8) connect a ferrule or other connection feature of the harness to the connection portion 350.

Another example of use of the connector 100 is as follows: (1) move the connector 100 to the straight position (if not already in the straight position); (2) feed the fiber optic cables into the passageway 340; (3) continue feeding the fiber optic cables through the area 410; (4) push the fiber optic cables away from the area 420 using a tool inserted through the window 400; (5) continue feeding the fiber optic cables through the passageway 240; feed the fiber optic cables into the cabinet; (6) connect the connector 100 to the cabinet; (7) move the connector 100 to the ninety-degree angled position, or to whatever position is desired; and (8) connect a ferrule or other connection feature of the harness to the connection portion 350.

The above examples of use of the connector 100 are just two examples of the order of steps in using the connector 100. Other orders will become apparent from this disclosure. For example, all feeding and connecting can take place before moving the connector 100 to the ninety-degree (or other) angled position such that moving the connector 100 to the ninety-degree (or other) angled position is the last step in installation.

The connector 100 can be moved from an angled position to the straight position at a later time (after initial installation) to remove the fiber optic cables and install different fiber optic cables.

In some embodiments, the seals 460 provide sealing only when the window 400 does not exist (fully closed) such as, for example, when the connector 100 is in the ninety-degree position or in a position close to the ninety-degree position.

As shown by the above examples, embodiments of the disclosure provide a connector that simplifies connection of a fiber optic cable harness to a cabinet. In particular, embodiments simplify the feeding of fiber optic cables of the harness through the connector that connects the cables/harness to the cabinet by providing an access window in the connector that allows an installer to guide the fiber optic cables through the connector while the connector is in, for example, a straight position.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

Various changes to the foregoing described and shown structures will now be evident to those skilled in the art. Accordingly, the particularly disclosed scope of the invention is set forth in the following claims.

What is claimed is:

1. A device for providing enhanced feeding of a fiber optic cable through a connector comprising:
- an enhanced feeding connector assembly structurally arranged to connect a cable harness having a fiber optic cable to a node, comprising:
  - a first portion structurally arranged to connect to a node;
  - a second portion structurally arranged to connect to a cable harness having a fiber optic cable;
- wherein the second portion is structurally arranged to include a second passageway that is structurally arranged to allow the fiber optic cable to pass through the second portion;
- wherein the first portion is structurally arranged to include a first passageway that is structurally arranged to allow the fiber optic cable to pass through the first portion and into the node;
- wherein one of the first portion and the second portion includes a central area therein, the central area being separate from the first passageway and the second passageway;
- wherein the central area is structurally configured to allow the fiber optic cable to pass from the second passageway to the first passageway;
- wherein the second portion is structurally arranged to be rotated relative to the first portion between a first position and a second position; and
- wherein the connector assembly is structurally arranged to provide enhanced feeding of the fiber optic cable through the connector assembly by permitting the second portion to be rotated relative to the first portion to the first position so as to provide an opening that permits access to the central area of the connector assembly from an area outside of the connector assembly other than through the first passageway and the second passageway.

2. The connector of claim 1, wherein the first portion is a cabinet-side portion.

3. The connector of claim 1, wherein the second portion is a harness-side portion.

4. The connector of claim 1, wherein the node comprises a cabinet.

5. The connector of claim 1, wherein in the first position, a central axis of the second passageway is aligned with a central axis of the first passageway.

6. The connector of claim 1, wherein in the second position, a central axis of the second passageway and a central axis of the first passageway form an angle less than 180 degrees.

7. The connector of claim 6, wherein in the second position, the central axis of the second passageway and the central axis of the first passageway form an angle of 90 degrees.

8. The connector of claim 1, wherein the first portion comprises an attachment portion that is structurally configured to connect the first portion to the node.

9. The connector of claim 8, wherein the attachment portion of the first portion is structurally configured as a first portion threaded portion.

10. The connector of claim 1, wherein the second portion comprises an attachment portion that is structurally configured to connect the second portion to the cable harness.

11. The connector of claim 10, wherein the attachment portion of the second portion is structurally configured as a second portion threaded portion.

12. A device for providing enhanced feeding of a fiber optic cable through a connector comprising:
- an enhanced feeding connector assembly structurally arranged to connect a cable harness having a fiber optic cable to a node comprising:
  - a first portion structurally arranged to connect to a node;
  - a second portion structurally arranged to connect to a cable harness having a fiber optic cable;
- wherein the second portion is structurally arranged to include a second passageway;
- wherein the first portion is structurally arranged to include a first passageway;
- wherein the first passageway and the second passageway are structurally arranged to provide a path for a fiber optic cable to pass through an interior of the connector assembly, the interior including a central area that is separate from the first passageway and the second passageway;
- wherein the second portion is structurally configured arranged to be rotated relative to the first portion between a first position and a second position; and
- wherein the connector assembly is structurally arranged to provide enhanced feeding of the fiber optic cable through the connector assembly by permitting the second portion to be rotated relative to the first portion to the first position so as to provide an opening that permits access to the central area of the connector assembly from an area outside of the connector assembly other than through the first passageway and the second passageway.

13. The connector of claim 12, wherein the second passageway is structurally arranged to allow the fiber optic cable to pass through the second portion.

14. The connector of claim 12, wherein the first passageway is structurally arranged to allow the fiber optic cable to pass through the first portion and into the node.

15. The connector of claim 12, wherein in the first position, a central axis of the second passageway is aligned with a central axis of the first passageway.

16. The connector of claim 12, wherein in the second position, a central axis of the second passageway and a central axis of the first passageway form an angle less than 180 degrees.

17. The connector of claim 16, wherein in the second position, the central axis of the second passageway and the central axis of the first passageway form an angle of 90 degrees.

18. The connector of claim 12, wherein the first portion comprises an attachment portion that is structurally arranged to connect the first portion to the node, and the attachment portion of the first portion is structurally arranged as a first portion threaded portion.

19. The connector of claim 12, wherein the second portion comprises an attachment portion that is structurally arranged to connect the second portion to the cable harness, and the attachment portion of the second portion is structurally arranged as a second portion threaded portion.

20. A device for providing enhanced feeding of a fiber optic cable through a connector comprising:

an enhanced feeding connector assembly structurally arranged to connect a cable harness having a fiber optic cable to a node comprising:

a first portion structurally arranged to connect to a node;

a second portion structurally arranged to connect to a cable harness having a fiber optic cable;

wherein the second portion is structurally arranged to include a second passageway;

wherein the first portion is structurally arranged to include a first passageway;

wherein the first passageway and the second passageway are structurally arranged to provide a path for a fiber optic cable to pass through an interior of the connector assembly, the interior including a central area that is separate from the first passageway and the second passageway;

wherein the second portion is structurally arranged to be rotated relative to the first portion between a first position and a second position; and wherein the connector assembly is structurally arranged to provide enhanced feeding of the fiber optic cable through the connector assembly by permitting the second portion to be rotated relative to the first portion to the first position so as to provide an opening that permits access to the central area of the connector assembly from an area outside of the connector assembly other than through the first passageway and the second passageway.

21. The connector of claim 20, wherein one of the first portion and the second portion includes a central area, the interior is a portion of the central area, and the central area is located between the first passageway and the second passageway.

22. The connector of claim 20, wherein in the first position, a central axis of the second passageway is aligned with a central axis of the first passageway.

23. The connector of claim 22, wherein in the second position, the central axis of the second passageway and the central axis of the first passageway form an angle less than 180 degrees.

* * * * *